(12) United States Patent
Runde et al.

(10) Patent No.: US 6,478,713 B1
(45) Date of Patent: Nov. 12, 2002

(54) ENGINE LIMIT CONTROL FOR CLOSED-THROTTLE TRANSMISSION SHIFTING

(75) Inventors: Jeffrey Kurt Runde, Fishers; Gregory A Hubbard, Carmel; Timothy Alan Robinson, Avon, all of IN (US)

(73) Assignee: General Motors Corporation, Detroit, MI (US)

( * ) Notice: Subject to any disclaimer, the term of this patent is extended or adjusted under 35 U.S.C. 154(b) by 46 days.

(21) Appl. No.: 09/692,809

(22) Filed: Oct. 23, 2000

(51) Int. Cl.[7] ................................. B60K 41/04
(52) U.S. Cl. .................... 477/107; 477/109; 477/113
(58) Field of Search ............................. 477/107, 109, 477/111, 112, 113; 701/103, 104

(56) References Cited

U.S. PATENT DOCUMENTS

| | | | |
|---|---|---|---|
| 4,070,927 A | | 1/1978 | Polak .......................... 74/765 |
| 4,671,139 A | | 6/1987 | Downs et al. ................. 74/866 |
| 5,046,174 A | | 9/1991 | Lentz et al. .............. 364/424.1 |
| 5,079,970 A | * | 1/1992 | Butts et al. ............... 192/109 F |
| 5,129,286 A | | 7/1992 | Nitz et al. .................... 74/858 |
| 5,211,079 A | | 5/1993 | Runde et al. ................. 74/866 |
| 5,282,401 A | * | 2/1994 | Hebbale et al. .............. 475/123 |
| 5,445,576 A | * | 8/1995 | Motamedi et al. .......... 477/102 |
| 5,568,387 A | * | 10/1996 | Andersson ................... 192/220 |
| 5,577,980 A | * | 11/1996 | Vukovich et al. ........... 477/144 |
| 5,601,506 A | | 2/1997 | Long et al. ................. 475/120 |
| 5,795,262 A | * | 8/1998 | Robinson ..................... 477/111 |
| 5,833,572 A | * | 11/1998 | Leising et al. .............. 477/102 |
| 5,855,533 A | * | 1/1999 | Tolkacz et al. ............. 477/110 |
| 6,024,672 A | * | 2/2000 | Chung ......................... 475/128 |
| 6,202,016 B1 | * | 3/2001 | Stephenson et al. .......... 701/51 |
| 6,254,509 B1 | * | 7/2001 | Meyer ......................... 477/109 |
| 6,308,125 B1 | * | 10/2001 | Gleason et al. ............... 701/67 |
| 6,319,170 B1 | * | 11/2001 | Hubbard et al. ............ 477/107 |
| 6,361,474 B1 | * | 3/2002 | Gleason et al. .......... 192/87.14 |

* cited by examiner

*Primary Examiner*—Rodney H. Bonck
*Assistant Examiner*—David D. Le
(74) *Attorney, Agent, or Firm*—Leslie C. Hodges

(57) ABSTRACT

An improved engine and transmission control method for coordinated control of closed-throttle transmission shifting, wherein the transmission control provides engine speed and torque rate limits to the engine control based on the shift parameters. The speed and/or torque rate limits come into play if the driver suddenly increases the engine throttle setting. Additionally, in driver requested garage shifts, initiation of the shift is prevented until the engine speed is within the speed limit. Preferably, the engine speed limit is set a calibrated amount above the computed input synchronization speed (SYNC). Alternately, the engine speed limit may be set to a value that limits the energy dissipated in the on-coming clutch to a predetermined value. With either approach, the engine speed and torque limits modify the engine control only to the extent necessary to preserve high shift quality while limiting the on-coming clutch energy dissipation to a safe level.

4 Claims, 2 Drawing Sheets

| RANGE \ CLUTCH | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

ENGINE LIMIT CONTROL FOR CLOSED-THROTTLE TRANSMISSION SHIFTING

TECHNICAL FIELD

This invention relates to closed-throttle shifting of an automatic transmission, and more particularly to an engine speed and torque rate limit control for ensuring high shift quality in spite of increases in the driver torque request.

BACKGROUND OF THE INVENTION

In general, a motor vehicle automatic transmission includes a number of gear elements and selectively engageable friction elements (referred to herein as clutches) that are controlled to selectively establish reverse or forward speed ratios between the transmission input and output shafts. The input shaft is coupled to the vehicle engine through a torque converter which is selectively locked or un-locked, and the output shaft is coupled to the vehicle drive wheels through a differential gearset. Shifting from a currently established speed ratio to new speed ratio involves, in most cases, disengaging a clutch (off-going clutch) associated with the current speed ratio and engaging a clutch (on-coming clutch) associated with the new speed ratio.

The present invention is directed to transmission shifting during conditions of zero or near-zero driver torque demand, such shifts being referred to herein as closed-throttle shifts. In general, closed-throttle shifts include garage shifts (that is, shifts involving a transmission range change) and downshifts during coasting or braking conditions. Most control strategies for closed-throttle shifting involve determining an input synchronization (SYNC) speed based on the product of the transmission output speed and the target speed ratio, and controlling the engagement of the on-coming clutch to bring the transmission input speed into correspondence with the determined SYNC speed. For example, in the U.S. Patents to Lentz et al. U.S. Pat. No. 5,046,174 and Runde et al. U.S. Pat. No. 5,211,079, the SYNC speed is used to compute the on-coming clutch slip, and the on-coming clutch is engaged by a closed-loop control based on a deviation of the on-coming clutch slip from a desired slip profile. In another type of control, disclosed in the U.S. Patent to Downs et al. U.S. Pat. No. 4,671,139, the off-going clutch is released after the transmission input speed falls below the engine idle speed, and the closed-throttle engine torque raises the input speed to the SYNC speed, whereupon the on-coming clutch is engaged.

Regardless of the shift control strategy, there is a possibility that the driver will suddenly depress the accelerator pedal (correspondingly increasing the driver torque request) between dis-engagement of the off-going clutch and engagement of the on-coming clutch. When this occurs, the engine speed typically flares well above the SYNC speed, causing excessive on-coming clutch slippage during shift completion. In open (un-locked) converter shifts, the problem can be even worse due to the torque multiplication provided by the torque converter. Ultimately, the on-coming clutch has to be engaged to complete the shift, and inevitably, poor shift quality and/or excessive heating of the on-coming clutch friction elements occur. One approach for mitigating the severity of the problem, at least in the case of a power-on upshift, is disclosed in the U.S. Patent to Nitz et al. U.S. Pat. No. 5,129,286, where the shift control algorithm commands an immediate retard of the engine spark timing when a flare condition is detected for substantially eliminating the transmission input torque, and then returns the timing to a normal setting when the flare condition has been eliminated. While this approach can also be used in closed-throttle shift controls, the abrupt spark retard can introduce a torque disturbance of its own, and a significant calibration effort is required in order to produce just the right amount of spark retard for a given shift condition. Accordingly, what is needed is an improved closed-throttle shift control that utilizes engine controls to limit the transmission input torque during the shift while preserving shift quality and preventing clutch heating.

SUMMARY OF THE INVENTION

The present invention is directed to an improved engine and transmission control method for coordinated control of closed-throttle transmission shifting, wherein the transmission control provides engine speed and torque rate limits to the engine control based on the shift parameters. The speed and/or torque rate limits come into play if the driver suddenly increases the engine throttle setting. Additionally, in driver requested garage shifts, initiation of the shift is prevented until the engine speed is within the speed limit.

Preferably, the engine speed limit is set a calibrated amount above the computed input synchronization speed (SYNC). This serves to limit the slip speed of the on-coming clutch to the predetermined amount, and also limits the torque multiplication of the torque converter during open (un-locked) converter shifts. Alternately, the engine speed limit may be set to a value that limits the energy dissipated in the on-coming clutch to a predetermined value. With either approach, the engine speed and torque limits modify the engine control only to the extent necessary to preserve high shift quality while limiting the on-coming clutch energy dissipation to a safe level.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
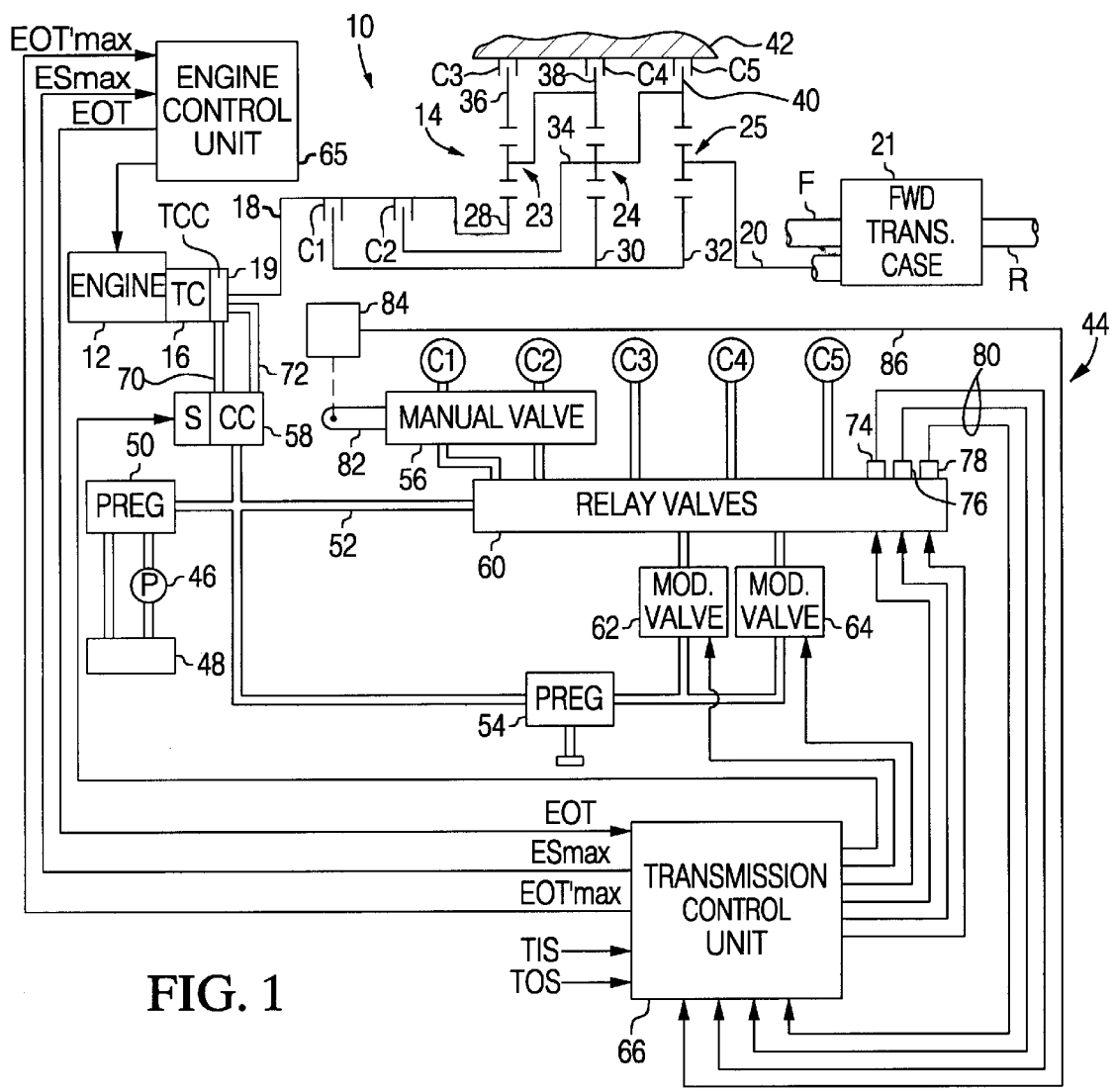
FIG. 1 is a diagram of an automatic transmission and microprocessor-based control unit for carrying out the control of this invention.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the second forward speed ratio is established when clutches C1 and C4 are engaged. Shifting from one speed forward speed ratio to another is generally achieved by disengaging one clutch (referred to as the off-going clutch) while engaging another clutch (referred to as the on-coming clutch). For example the transmission 14 is downshifted from second to first by disengaging clutch C4 while engaging clutch C5.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58, 60, 62 and 64.

The electronic portion of the control is primarily embodied in the engine control unit 65 and the transmission control unit 66, illustrated in FIG. 1 as two separate modules. Both control units 65, 66 are microprocessor-based, and may be conventional in architecture. The engine control unit 65 controls the operation of engine functions such as fuel, spark timing, and so on, in response to various inputs including the driver torque request TQ, and the transmission control unit 66 controls the solenoid operated fluid control valves 58–64 based on a number of inputs to achieve a desired transmission speed ratio. The transmission control unit inputs include signals representing the transmission input speed TIS and the transmission output speed TOS. Sensors for developing such signals may be conventional in nature, and have been omitted for simplicity. Additionally, the engine control unit 65 supplies an engine output torque signal EOT to transmission control unit 66, and transmission control unit 66 supplies a speed limit signal ESmax and torque rate limit signal EOT' max to engine control unit 65.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for engaging and/or disengaging the respective clutches C1–C5, develops corresponding force motor current commands, and then supplies current to the respective force motors in accordance with the current commands.

The present invention is directed to an improved control strategy for shifts that are intended to be performed under closed engine throttle conditions, such as closed-throttle downshifts and driver requested garage shifts. In such shifts, excessive energy dissipation in the on-coming clutch due to a sudden increase in the driver torque request is prevented by suitably limiting the engine speed and torque rate during the shift. Also, in driver requested garage shifts, initiation of the shift is prevented until the engine speed is within the speed limit. Preferably, the engine speed limit is set a calibrated amount above the computed input synchronization speed (SYNC). This serves to limit the slip speed of the on-coming clutch to the predetermined amount during locked converter shifts, and limits the torque multiplication of the torque converter during open (un-locked) converter shifts. The input synchronization speed SYNC is computed according to the product (TOS*SRnew), where SRnew is the new or target speed ratio, and the engine speed limit ESmax is determined according to the sum (SYNC+CAL), where CAL is calibrated slip speed. Alternately, the engine speed limit ESmax may be set to a value that limits the energy dissipated in the on-coming clutch to a predetermined value. In such case, the slip speed corresponding to CAL may either be computed or determined by table look-up—as a function of output speed TOS in the case of an open-converter shift, or as a function of output speed TOS and engine output torque EOT in the case of a locked-converter shift. With either of the approaches, the engine speed and torque limits modify the engine control only to the extent necessary to preserve high shift quality while limiting the oncoming clutch energy dissipation to a safe level.

Figure 3:
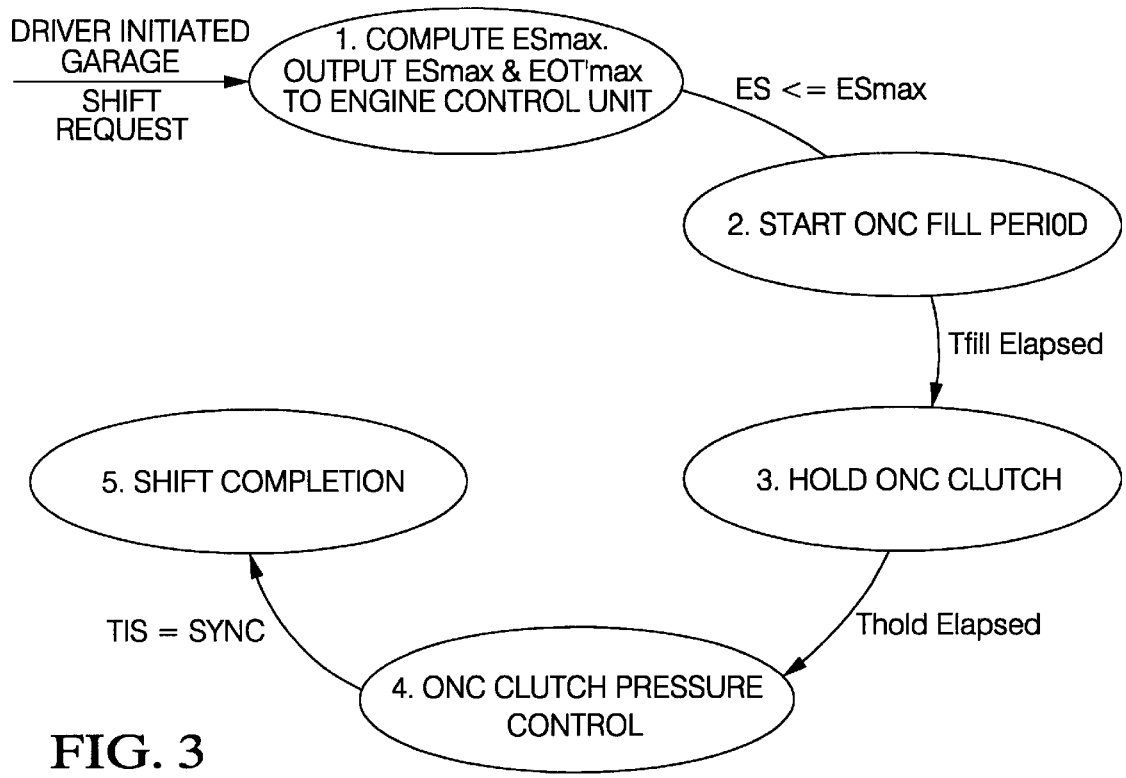
FIG. 3 is a state diagram illustrating the control of this invention as applied to a driver initiated garage shift.

FIG. 3 is a state diagram illustrating the control of this invention as applied to a driver requested garage shift. When a garage shift is requested, the transmission control unit 66 enters a first state in which the engine speed limit ESmax is determined as described above, and then outputted along with the torque rate limit value EOT'max to the engine control unit 65. If the engine speed ES is at or below ESmax, the control unit 66 transitions to a second state in which the pressure command Ponc is set equal to a fill pressure Pfill to fill the on-coming clutch in preparation for engagement. When the fill period Tfill has elapsed, the control transitions to a HOLD state in which the pressure command Ponc is set to a value that maintains the on-coming clutch in readiness for engagement. When the hold interval Thold has elapsed, the control transitions to an ONC Pressure Control state in which Ponc is increased according to a suitable control strategy for bringing the transmission input speed TIS into correspondence with the synchronization speed SYNC. By way of example, one such suitable control strategy is disclosed in the U.S. Pat. No. 6,358,184, issued on Mar. 19, 2002. Once the input speed TIS reaches SYNC, the control transitions to the Shift Completion state in which Ponc is increased to the full or main pressure value Pfull to complete the garage shift, and ESmax and EOT'max are increased to maximum values at a rate to quickly but smoothly disengage the engine torque control.

Figure 4:
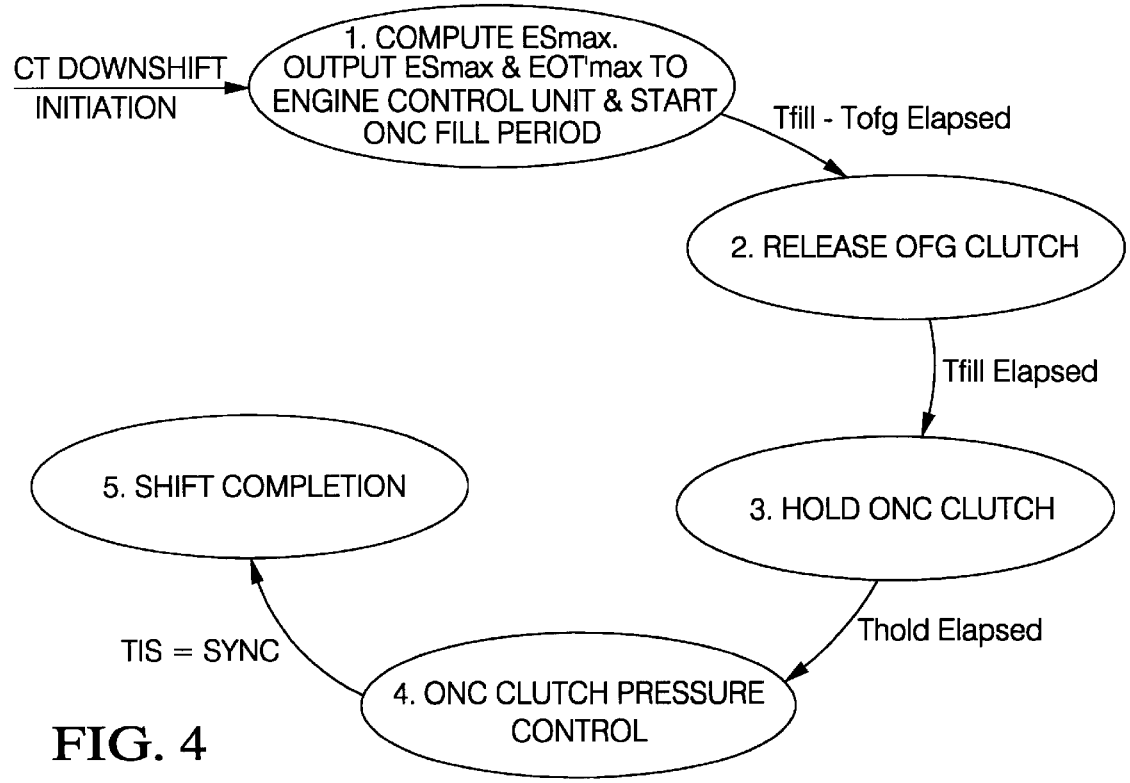
FIG. 4 is a state diagram illustrating the control of this invention as applied to a closed-throttle downshift.

FIG. 4 is a state diagram illustrating the control of this invention as applied to a closed-throttle downshift. When a closed-throttle downshift is initiated, the control unit 66 enters a first state in which the speed and torque rate limit values ESmax, EOT'max are outputted to the engine control unit 65, and the pressure command Ponc is set equal to a fill pressure Pfill to fill the on-coming clutch in preparation for engagement. At a predetermined time (Tofg) prior to Tfill, the control transitions to a second state in which the pressure command Pofg is progressively decreased to disengage the off-going clutch. When the fill period Tfill has elapsed, the control transitions to a Hold state in which the pressure command Ponc is set to a value that maintains the on-coming clutch in readiness for engagement. When the hold interval Thold has elapsed, the control transitions to an ONC Pressure Control state in which Ponc is increased according to a suitable control strategy for bringing the transmission input speed TIS into correspondence with the synchronization speed SYNC. By way of example, one such suitable control strategy is disclosed in the U.S. Pat. No. 6,308,125, issued on Oct. 23, 2001. Once the input speed TIS reaches SYNC, the control transitions to the Shift Completion state in which Ponc is increased to the full or main pressure value Pfull to complete the closed-throttle downshift, and ESmax and EOT'max are increased to maximum values at a rate to quickly but smoothly disengage the engine torque control.

With either type of closed-throttle shift, the engine speed and torque rate limits ESmax, EOT'max are enforced by the engine control unit 65, ensuring that the shift can be completed without overheating the on-coming clutch or significantly degrading the shift quality, even if the driver torque request is suddenly increased during the shift. In the case of driver-initiated garage shifts, delaying shift initiation until the engine speed falls below ESmax protects the on-coming clutch from degradation due to abusive driver behavior while allowing the shift to be safely initiated and completed even though the engine throttle is not completely closed.

While described in reference to the illustrated embodiment, it will be understood that various modifications in addition to those mentioned above will occur to those skilled in the art. For example, it will be recognized that the control of this invention can be utilized with various shift control strategies other than those referred to herein. Accordingly, it will be understood that controls incorporating these and other modifications may fall within the scope of this invention, which is defined by the appended claims.

What is claimed is:

1. A method of controlling a closed-throttle shift of a motor vehicle automatic transmission to a target speed ratio, where the transmission has an input shaft rotatably driven by an engine having a control unit and a throttle manipulated by an operator of the vehicle, and an on-coming clutch of the transmission is controllably engaged to bring a rotational speed of the input shaft into correspondence with a synchronization speed of the target speed ratio, the method comprising the steps of:

determining a permitted slip speed for said on-coming clutch;

determining an engine speed limit according to a sum of said synchronization speed and said permitted slip speed;

supplying an engine speed limit value to the engine control unit for preventing a rotational speed of the engine from exceeding said determined limit despite operator manipulation of said throttle which would otherwise raise the speed of said engine above such determined limit; and progressively increasing the supplied engine speed limit value following engagement of said on-coming clutch to return control of the engine speed to said operator.

2. The method of claim 1, including the steps of:

supplying an engine torque rate limit value to the engine control unit for preventing an output torque of the engine from increasing at a rate in excess of a predetermined torque rate limit despite operator manipulation of said throttle which would otherwise raise the engine output torque at a rate higher than such predetermined torque rate limit; and progressively increasing the supplied engine torque rate limit value following engagement of said on-coming clutch to return control of the engine output torque to said operator.

3. The method of claim 1, including the step of:

determining said permitted slip speed such that it corresponds to a predetermined level of energy dissipation in said on-coming clutch.

4. The method of claim 1, wherein the closed-throttle shift is an operator initiated garage shift, and the method includes the step of:

delaying the engagement of said on-coming clutch until the engine speed is below said determined engine speed limit.

* * * * *